United States Patent
Muller (10) Patent No.: US 9,633,000 B2
(45) Date of Patent: *Apr. 25, 2017

(54) DICTIONARY BASED SOCIAL MEDIA STREAM FILTERING

(71) Applicant: INTERNATIONAL BUSINESS MACHINES CORPORATION, Armonk, NY (US)

(72) Inventor: Michael Muller, Medford, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/744,173

(22) Filed: Jun. 19, 2015

(65) Prior Publication Data

US 2016/0259777 A1 Sep. 8, 2016

Related U.S. Application Data

(63) Continuation of application No. 14/640,106, filed on Mar. 6, 2015.

(51) Int. Cl.
*G06F 17/28* (2006.01)
*G06F 17/27* (2006.01)

(52) U.S. Cl.
CPC ........ *G06F 17/2735* (2013.01); *G06F 17/28* (2013.01)

(58) Field of Classification Search
IPC .................................................. G06F 17/2735
See application file for complete search history.

(56) References Cited

U.S. PATENT DOCUMENTS

| 8,725,495 | B2 | 5/2014 | Peng et al. | |
|---|---|---|---|---|
| 8,832,092 | B2* | 9/2014 | Spivack | G06F 17/275 707/723 |
| 2004/0021691 | A1* | 2/2004 | Dostie | G06F 3/0237 715/773 |
| 2009/0048823 | A1* | 2/2009 | Liu | G06F 17/2765 704/9 |
| 2009/0216524 | A1* | 8/2009 | Skubacz | G06F 17/2785 704/9 |
| 2011/0010655 | A1* | 1/2011 | Dostie | G06F 3/0237 715/773 |
| 2011/0167115 | A1* | 7/2011 | Gilbert | G06Q 10/00 709/204 |

(Continued)

*Primary Examiner* — Douglas Godbold
(74) *Attorney, Agent, or Firm* — Tutunjian & Bitetto, P.C.; Alexa Ashworth (57) ABSTRACT

A method is provided in a computer processing system that reads and displays a social media stream accessible by a plurality of users. A system is also provided that reads and displays a social media stream accessible by a plurality of users. The method includes receiving, by a processor-based dictionary manager, at least one dictionary configuration. Each dictionary configuration specifies at least one dictionary from a set of dictionaries and respective settings for the at least one dictionary. The method further includes filtering, by a filter, the social media stream using the at least one dictionary configuration to provide at least one filtered social media stream. The respective settings for the at least one dictionary include a respective dictionary influence polarity and a respective polarity magnitude for the respective dictionary influence polarity.

18 Claims, 8 Drawing Sheets

(56) References Cited

U.S. PATENT DOCUMENTS

| | | | |
|---|---|---|---|
| 2014/0278349 A1* | 9/2014 | Grieves | G06F 17/2735 704/8 |
| 2014/0358523 A1* | 12/2014 | Sheth | G06F 17/2785 704/9 |
| 2015/0073774 A1* | 3/2015 | Becker | G06F 17/2735 704/9 |
| 2015/0100537 A1* | 4/2015 | Grieves | G06N 5/048 706/52 |
| 2015/0227528 A1* | 8/2015 | Kang | G06F 17/27 707/750 |
| 2016/0004687 A1* | 1/2016 | Kurian | G06F 17/2735 704/10 |
| 2016/0055235 A1* | 2/2016 | Zhang | G06F 17/30684 707/749 |

\* cited by examiner

DICTIONARY BASED SOCIAL MEDIA STREAM FILTERING

CROSS-REFERENCE TO RELATED APPLICATIONS

This application is a Continuation application of co-pending U.S. patent application Ser. No. 14/640,106 filed on Mar. 6, 2015 incorporated herein by reference in its entirety.

BACKGROUND

Technical Field

The present invention relates generally to information processing and, in particular, to dictionary based social media stream filtering.

Description of the Related Art

Dictionary-based linguistic analysis has become commercially important. The better-known applications of such analysis are usually described as "sentiment analysis", in which a large body of social media is compared with the following two dictionaries: (1) a dictionary of positive words; and (2) a dictionary of negative words. Each posting in the social media receives a score based on word-matches to these two dictionaries. A posting that has a higher positive score is considered to indicate positive sentiment, and a posting that has a higher negative score is considered to indicate negative sentiment. When the social media stream is carefully targeted (i.e., with a mention of a particular brand), then the aggregate positive or negative score can have importance as commercial intelligence.

Regarding the use of such dictionaries, typically, in prior art approaches, researchers assemble multiple dictionaries, and score each social media posting using all of the dictionaries. The next step is collecting some form of "ground truth" for a particular concept of interest. As used herein, "ground truth" refers to a "true" estimate of the accurate classification or attribute, which can then be predicted on the basis of other attributes. Then, a sophisticated analysis is conducted using multiple regression methods or machine-learning, to reduce the wide diversity of dictionaries down to a small number of crucial concepts that are the best predictors of that "ground truth" data. Thus, existing approaches to addressing the problem of applying dictionaries to social media are highly quantitative, and are the domain of experts.

SUMMARY

According to an aspect of the present principles, a method is provided in a computer processing system that reads and displays a social media stream accessible by a plurality of users. The method includes receiving, by a processor-based dictionary manager, at least one dictionary configuration. Each dictionary configuration specifies at least one dictionary from a set of dictionaries and respective settings for the at least one dictionary. The method further includes filtering, by a filter, the social media stream using the at least one dictionary configuration to provide at least one filtered social media stream. The respective settings for the at least one dictionary include a respective dictionary influence polarity and a respective polarity magnitude for the respective dictionary influence polarity.

According to another aspect of the present principles, a system is provided that reads and displays a social media stream accessible by a plurality of users. The system includes a dictionary manager for managing a set of dictionaries selected for filtering the social media stream, respective settings that control an influence, of at least one of the dictionaries in the set, on the filtering, and at least one dictionary configuration. Each dictionary configuration specifies one or more of the dictionaries in the set and the respective settings therefor. The system further includes a filter for filtering the social media stream using the at least one dictionary configuration to provide a filtered social media stream. The respective settings, for any of the dictionaries in the set, include a respective dictionary influence polarity and a respective polarity magnitude for the respective dictionary influence polarity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to dictionary based social media stream filtering.

As noted above, existing approaches to addressing the problem of applying dictionaries to social media are highly quantitative, and are the domain of experts. However, in a real organization, layperson users will need to design their own filters on an "on-demand" basis, and will need to share those filters as collaborative tools and/or in the context of collective intelligence (e.g., enhanced views of problem domains, such as market campaigns or scans for hostile conspiracies).

Advantageously, the present principles open what has conventionally been a specialist's domain, to end-users who have work-practice knowledge (e.g., human resources, public health, intelligence services, etc.) but who may not have formal statistical skills to create and evaluate different regression or machine-learning models.

The present principles bring together the following two topics: (1) linguistic analysis based on thematic dictionaries; and (2) cognitive computing that is integrated into a user's core work.

The present principles are directed to an approach that requires less statistical formality as well as other beneficial differences as compared to prior art approaches. In an embodiment of the present principles, one or more users can experiment with filtering a social media stream (a series of postings) through one or more dictionaries. In an embodiment, the present principles can be directed to the user experience for that user during the experimentation. The user or users (hereinafter simply "user") can select one or more dictionaries, can adjust the strength and "polarity" of each dictionary within the filter, and can immediately view the results in a refresh social media stream. The user can save a "configuration" of dictionaries (also referred to herein as "dictionary configuration") and their settings (respective strength and polarity for each dictionary), along with explanatory comments, and can share that saved configuration for re-use by other employees.

In an embodiment, the present principles are directed to a graphical user interface through which one or more people can choose from a set of dictionaries, and experiment with creating different filters as combinations of those dictionaries, and can immediately observe the results of those modifications on an existing social media stream. Exemplary capabilities, features, and advantages capable of being included in embodiments of the present principles include the following:

choosing one or more dictionaries;
creating or modifying settings for how each dictionary will act as a filter component on a social media stream;
adding modifier dictionaries to the primary dictionaries (where a "modifier" dictionary is typically a set of words that can enhance the primary dictionary's effect, that is, "booster" words", and/or a set of words that can diminish the primary dictionary's effect, that is, "hedge words");
examining the effect of each dictionary upon the social media stream;
creating named combinations of dictionaries that can be treated as a conceptual unit within the filter (e.g., "emotion dictionaries" or "respect dictionaries" or "task-completion dictionaries");
requesting and receiving recommendations of additional dictionaries from a cognitive system;
saving a configuration of dictionaries and their filter-settings;
sharing the saved configuration with other users;
requesting and receiving recommendations of additional other users with whom to share the configuration; and
adjusting the overall "throughput" or volume-of-output of a parameterized filter.

Figure 1:
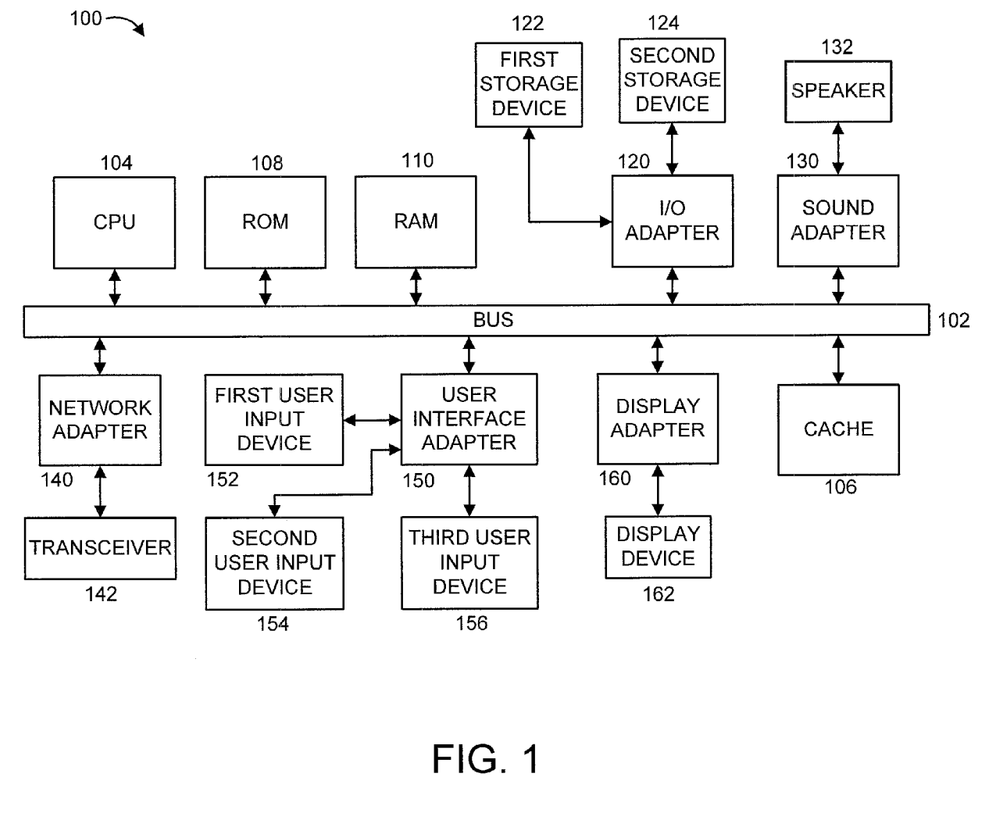
FIG. 1 shows an exemplary processing to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
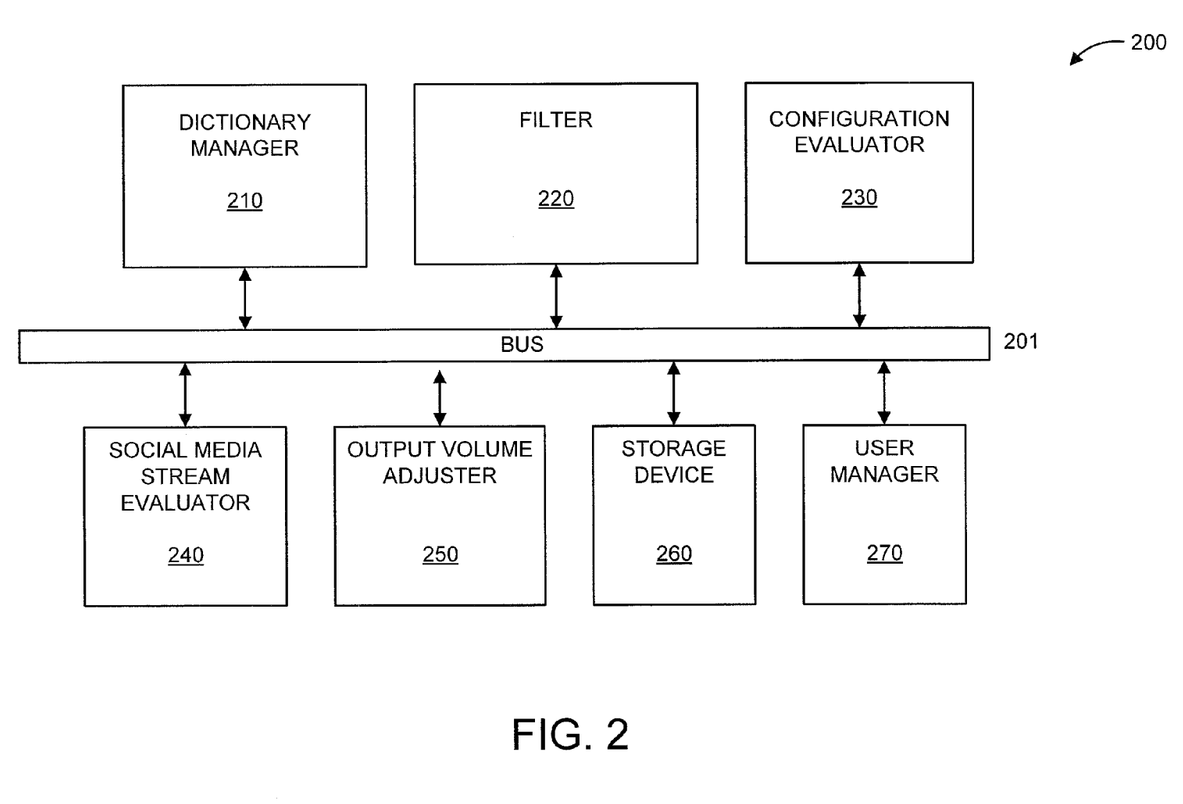
FIG. 2 shows an exemplary system 200 for filtering a social media stream using linguistic dictionaries, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
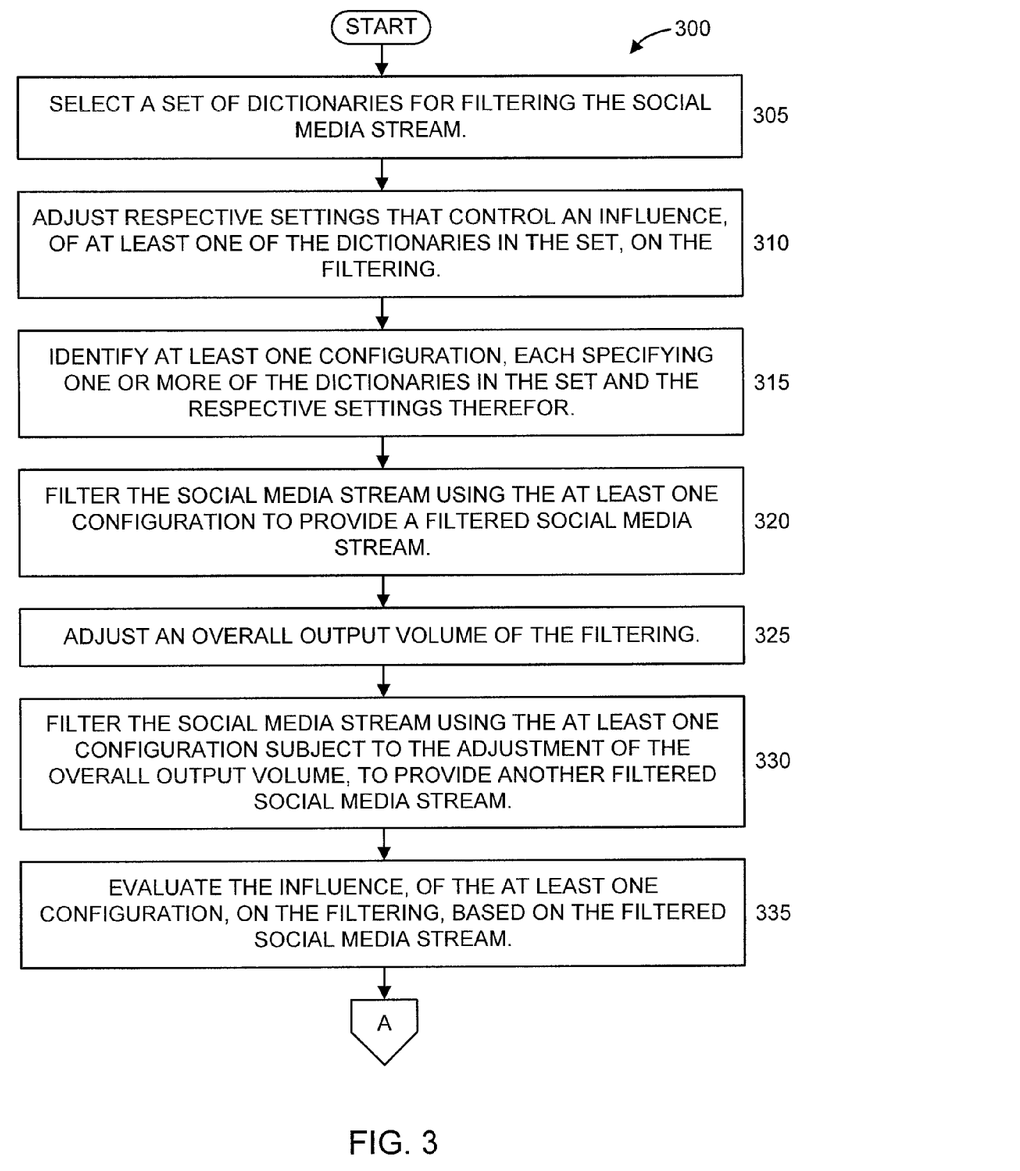
FIGS. 3-5 shows an exemplary method 300 for filtering a social media stream using linguistic dictionaries, in accordance with an embodiment of the present principles.
Figure 4:
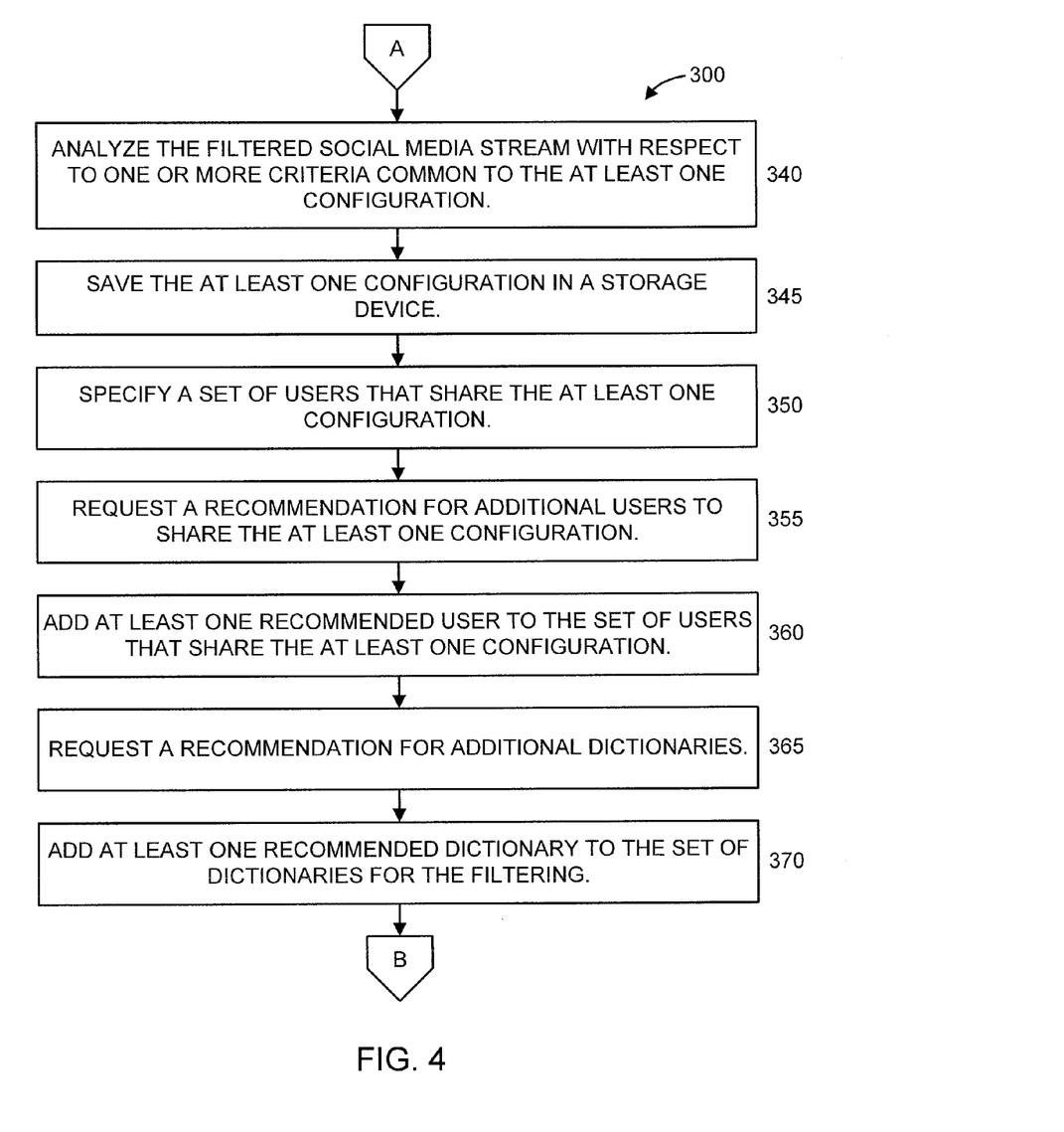
Figure 5:
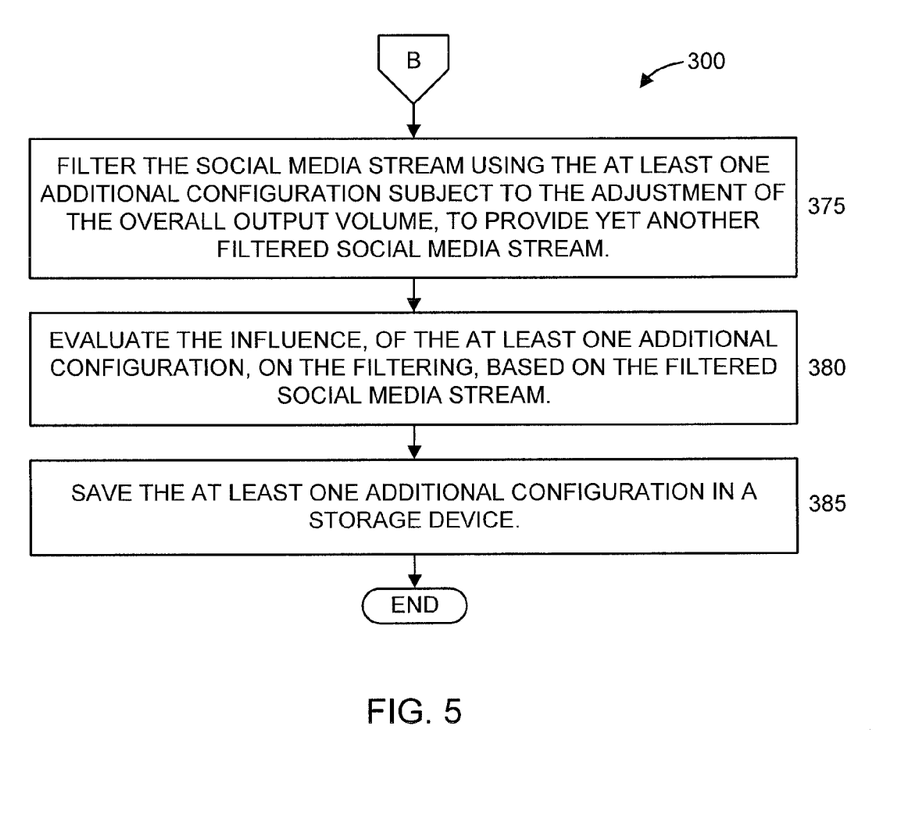

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

FIG. 2 shows an exemplary system 200 for dictionary based social media stream filtering, in accordance with an embodiment of the present principles. While many aspects of system 200 are described in singular form for the sakes of illustration and clarity, the same can be applied to multiples ones of the items mentioned with respect to the description of system 200. For example, while a set of dictionaries is mentioned with respect to the dictionary manager 210, more than one set of dictionaries can be used in accordance with the teachings of the present principles, while maintaining the spirit of the present principles. Moreover, it is appreciated that the set of dictionaries is but one aspect involved with system 200 than can be extended to plural form while maintaining the spirit of the present principles.

The system 200 can include a dictionary manager 210, a filter 220, a configuration evaluator 230, a social media stream evaluator 240, an output volume adjuster 250, a storage device 260, and a user manager 270.

The dictionary manager 210 manages a set of dictionaries for filtering the social media stream as well as settings for the dictionaries in the set. The dictionary manager 220 also manages configurations (e.g., combinations) of the dictionaries in the set as well as setting for the configurations. The configurations allow for less than all of the dictionaries in the set to be used for filtering and/or all or less than all of the dictionaries in the set, but with different settings, for example, for the same dictionaries in different configurations. These and other variations between configurations are readily determined by one of ordinary skill in the art given the teachings of the present principles provided herein, while maintaining the spirit of the present principles.

The filter 220 performs filtering of the social media stream using one or more of the dictionaries in the set. Such filtering can be on a configuration basis. As used herein, the term "filtering" can include filtering as well as refreshing the social media stream after a filtering operation has been performed on the social media stream.

In an embodiment, filtering can involve actions that assign a priority and/or change the priority of a particular social media item, such as a posting, a blog entry, a discussion forum contribution, a status update, or other diverse forms of user contributions to social media. In the simplest of cases, a change in priority either increases or decreases the priority of the social media item, based on its computed relationship to at least one dictionary that has been specified by the user. More complex cases of changes in priority can be made conditional, for example, on a collection of social media items, such as requiring a minimum number of items before their individual or collective priority is changed. The changes to priorities in this collection case may be made to selected ones of the social media items in the collection, or all items in the collection, or the collection treated as a single entity.

The configuration evaluator 230 evaluates the influences of respective configurations on a filtering operation based on a resultant filtered social media stream. That is, after the social media stream has been filtered using a particular configuration to obtain a resultant filtered stream, the influence of that particular configuration the filtering operation is determined from the resultant filtered stream. In this way, tailored filtering of streams can be performed based on evaluation results.

In an embodiment, the configuration evaluator 230 evaluates the resultant filtered social media stream with respect to the particular settings for a given configuration including, for example, the respective dictionary influence polarities (hereinafter "influence polarities") and respective polarity magnitudes ("polarity magnitudes") for the respective dictionary influence polarities for the dictionaries that are included in the given configuration. In this way, any of the influence polarities and/or the polarity magnitudes can be evaluated to determine their particular influence on the filtering such that tailored filtering can be performed on a social media stream.

The social media stream evaluator 240 analyzes the filtered social media stream with respect to one or more criteria common and/or otherwise related to the at least one configuration that is used to filter the social media stream. The criteria used for the analysis is dependent upon the particular implementation and can thus vary accordingly. For example, whatever particular topics are of interest can be analyzed. Some exemplary topics of interest can relate to, for example, but are not limited to, pronouns, prepositions, family, friends, money, religion, specific emotions (e.g., anger, joy, sadness, etc.), certainty and uncertainty, gain or loss of respect, power-through-cooperation, power-through-conflict, engagement, and even broader personality attributes, as well as non-personality attributes. It is to be appreciated that the preceding topics are merely illustrative and, thus, the present principles can involve other topics while maintaining the spirit of the present principles. Thresholds and/or other ways of making use of the resultant date obtained from a filtered social media stream can be used in accordance with the teachings of the present principles to perform the analysis, while maintaining the spirit of the present principles.

The output volume adjuster 250 adjusts the overall output volume of the filtering. Such adjustment can be performed in response to a user setting for the same, a default value, and so forth.

The storage device 260 (e.g., a persistent memory device) stores the dictionaries in the set as well as settings for the dictionaries. Moreover, the storage device stores configurations as well as settings for the configurations.

The user manager 270 manages users with respect to the configurations that they can share with other users. Hence, the user manager 270 can manage a database of users authorized to share one or more configurations. Regarding the word "share", the following is to be appreciated. Conventionally, a data object can be shared between two persons or machines if they both have access to the data object. In social media, "share" is often used as an active verb, as a kind of recommendation, as in "John shared document X with Bob". Accordingly, the term "share" as used herein can involve one or both of the preceding meanings for the word "share".

In the embodiment shown in FIG. 2, the elements thereof are interconnected by a bus 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIGS. 3-5 show an exemplary method 300 for dictionary based social media stream filtering, in accordance with an embodiment of the present principles. The method 300 can be performed by a computer processing system that reads and displays a social media stream accessible by one or a plurality of users. In an embodiment, the computer processing system can be any of system 100 of FIG. 1 and/or system 200 of FIG. 2.

At step 305, select a set of dictionaries for filtering the social media stream. In an embodiment, step 305 can involve selecting one or more primary dictionaries and one or more modifier dictionaries. Each of the one or more modifier dictionaries can include a set of booster words that enhance an influence of a respective primary dictionary and/or a set of hedge words that diminish the influence of a respective primary dictionary.

It is to be appreciated that boosters and hedges are exemplary. Accordingly, other forms of modification can also be used in accordance with the teachings of the present principles including, for example, but not limited to, overstatement and understatement, the use of "strong" or "weak" words, possessive pronouns ("mine" versus "ours" versus "yours"), time-based pronouns (words relating to the past versus the present versus the future), or "framing" words or phrases that differentiate one concept from another ("in this" versus "in that" or "by contrast" or "a second case" or "conversely", and so forth). The linguistic concept of "adverbials" covers these and many other ways of modifying or distinguishing words, by themselves, or in relation to other words.

Another, more complex class of modifiers that can be used in accordance with the teachings of the present principles can involve conditionality based on presence/absence of different items (e.g., "if A is present, then increment priority only if B is also present and if C is not present"), or presence of a specified quantity of related items (e.g., "if three or more of A are present . . . ").

At step 310, adjust respective settings that control an influence, of at least one of the dictionaries in the set, on the filtering. It is to be appreciated that step 310 can involve either adjusting an already specified value (specified by any of: default, a system, or a user) value for a given setting or initially specifying a value for a given setting. In an embodiment, step 310 can involve, for at least one of the dictionaries in the set, specifying the respective dictionary influence polarity, and specifying the respective polarity magnitude for the respective dictionary influence polarity.

It is to be appreciated that different primary dictionaries can have different polarities and/or different magnitudes. Moreover, it is to be appreciated that different modifier dictionaries, even if pertaining to the same primary dictionary, can have different polarities values and/or different magnitudes. These and other variations are readily determined by one of ordinary skill in the art given the teachings of the present principles provided herein, while maintaining the spirit of the present principles.

At step 315, identify at least one configuration, each specifying one or more of the dictionaries in the set and the respective settings therefor. In an embodiment, step 315 can involve specifying, from the dictionaries in the set, at least one combination of dictionaries from the set to be used as a unit for the filtering. In an embodiment, step 315 can involve specifying a respective name for each combination. Moreover, it is to be appreciated that any subsequent steps can involve initiating an action that involves the at least one combination by referring to the respective name for the at least one combination.

At step 320, filter the social media stream using the at least one configuration to provide a filtered social media stream.

At step 325, adjust an overall output volume of the filtering. In an embodiment, this can involve an adjustment to the configuration. In another embodiment, this can be applied over the configuration, that is, on top of the configuration settings while not changing the configuration settings.

At step 330, filter the social media stream using the at least one configuration subject to the adjustment of the overall output volume, to provide another filtered social media stream.

At step 345, evaluate the influence, of the at least one configuration, on the filtering, based on the filtered social media stream.

At step 350, analyze the filtered social media stream with respect to one or more criteria common to the at least one configuration.

At step 345, save the at least one configuration in a storage device.

At step 350, specify a set of users that share the at least one configuration.

At step 355, request a recommendation for additional users to share the at least one configuration.

At step 360, add at least one recommended user to the set of users that share the at least one configuration.

At step 365, request a recommendation for additional dictionaries. In an embodiment, step 365 can involve issuing a request for the recommendation to a cognitive system. In another embodiment, step 365 can involve issuing a request for the recommendation to one or more other users (for example, a user from the set of users that share the at least one configuration, and/or other users). In another embodiment, one or more recommended additional dictionaries can be sent without the issuance of a request for the same.

At step 370, add at least one recommended dictionary to the set of dictionaries for the filtering. In an embodiment, step 370 can involve specifying at least one additional configuration that includes the least one recommended dictionary and/or modifying an existing configuration to include the at least one recommended dictionary. The addition of a dictionary to the set of dictionaries and/or to a configuration can include assuming default values for the settings for the dictionary or taking on user specified values for the setting (e.g., at the time the dictionary is added, or a later time).

At step 375, filter the social media stream using the at least one additional configuration subject to the adjustment of the overall output volume, to provide yet another filtered social media stream.

At step 380, evaluate the influence, of the at least one additional configuration, on the filtering, based on the filtered social media stream.

At step 385, save the at least one additional configuration in a storage device.

Thus, among other types of dictionary-based linguistic analysis, the present principles can be applied to sentiment analysis. It is to be appreciated that when a social media stream is carefully targeted (i.e., with a mention of a particular brand), then the aggregate positive or negative score provided by a sentiment analysis can have importance as commercial intelligence.

In addition to sentiment analysis, observed or inferred attributes of the authors of each posting can be used to generate more specific market insights, such as "sentiment for brand XYZ among millennials" or "change in sentiment for a particular Senate candidate in rural parts of the state."

Thus, in addition to a dictionary of positive words for positive sentiment and/or a dictionary of negative words for negative sentiment, or in substitution of such dictionaries, other dictionaries for other, more specific concepts can be used, such as for specific emotions (e.g., anger, joy, sadness, etc.), certainty and uncertainty, gain or loss of respect, power-through-cooperation, power-through-conflict, engagement, and even broader personality attributes, as well as non-personality attributes. Moreover, dictionaries can be grouped together in respective sets. For example, there can be task dictionaries, affect dictionaries, team dictionaries, my dictionaries, and so forth. The task dictionaries can include, for example, a plan dictionary, a begin dictionary, a problem-solve dictionary, a complete dictionary, a failure dictionary, and so forth. The affect dictionary can include a negative dictionary, a positive dictionary, an anxious dictionary, an arousal dictionary, an optimism dictionary, and so forth. The team dictionaries can include a personal agent's dictionary, a society of cogs dictionary, a mergers and acquisitions dictionary, a mining dictionary, an IP dictionary, a conferences dictionary, and so forth. My dictionaries can include a management chain dictionary, a mentoring dictionary, a reputation dictionary, and any dictionary involving a topic of interest to a particular user. Dictionaries from different sets, each representative of a particular group of dictionaries, can be combined into respective combinations/ configurations. It is to be appreciated that the preceding types of dictionaries are merely illustrative and, thus, the present principles can use other types of dictionaries while maintaining the spirit of the present principles.

In an embodiment, the present principles can be used to explore a collaborative (or solo) application using new tools for dictionary-based text analytics. The application can be used on a desktop computer, a tablet, a laptop, any computing device having a user interface allowing interaction by a user with an application in accordance with the teachings of the present principles.

In an embodiment, the present principles can be used to explore new ways of combining dictionary-based analytics for novel application domains.

In an embodiment, the present principles can be used for any of the following potential application domains: internal applications; commercial applications; Federal applications; political applications; scholarly applications, and so forth. Regarding internal applications, an employee or a team want to read the social media "buzz" of their organization. Regarding commercial applications, the same can involve a targeted extension to commercial sentiment analysis. Regarding Federal applications, in a FEMA emergency management team (e.g., a National Incident Management System (NIMS) structure), part of the job of the Public Information Officer is to sense the public's mood and reaction to the changing conditions of the emergency. The present principles can be used to sense the preceding. Regarding political applications, during a political campaign, the candidate and her/his campaign staff may want daily monitoring of the public's interest and reaction to specific, campaign-related themes. Regarding scholarly applications: Text analysis is an important tool in digital humanities studies, where the "social media" can take the form of longer documents such as letters, contracts, or journal entries. The preceding are merely illustrative examples of various uses that can be made of the present principles. Accordingly, the present principles are not limited to such uses and, hence, other uses of the present principles, as readily contemplated by one of ordinary skill in the art given the teachings of the present principles provided herein, can be used while maintaining the spirit of the present principles.

It is to be appreciated that in an embodiment of the present principles, a tool is provided for non-statisticians to use in creating filters that are important in their own work areas, and to work with concepts that are much more nuanced and targeted than the relatively broad concepts of "positive sentiment" and "negative sentiment" as used in the prior art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
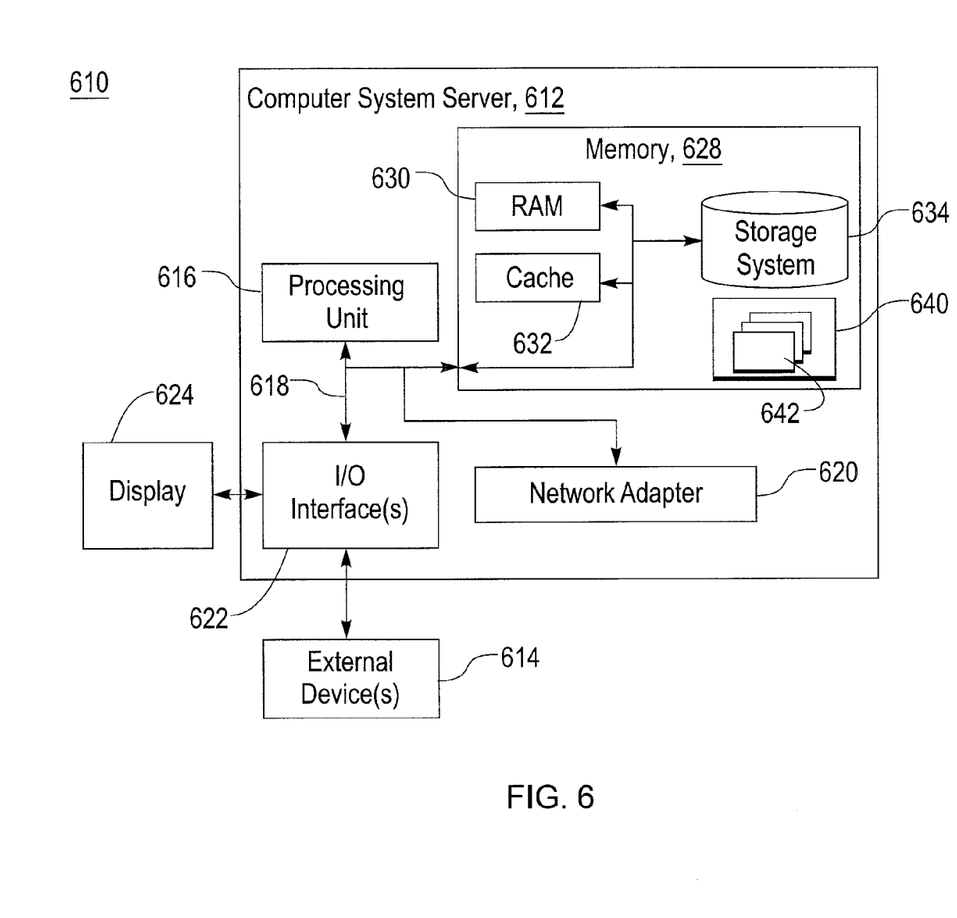
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
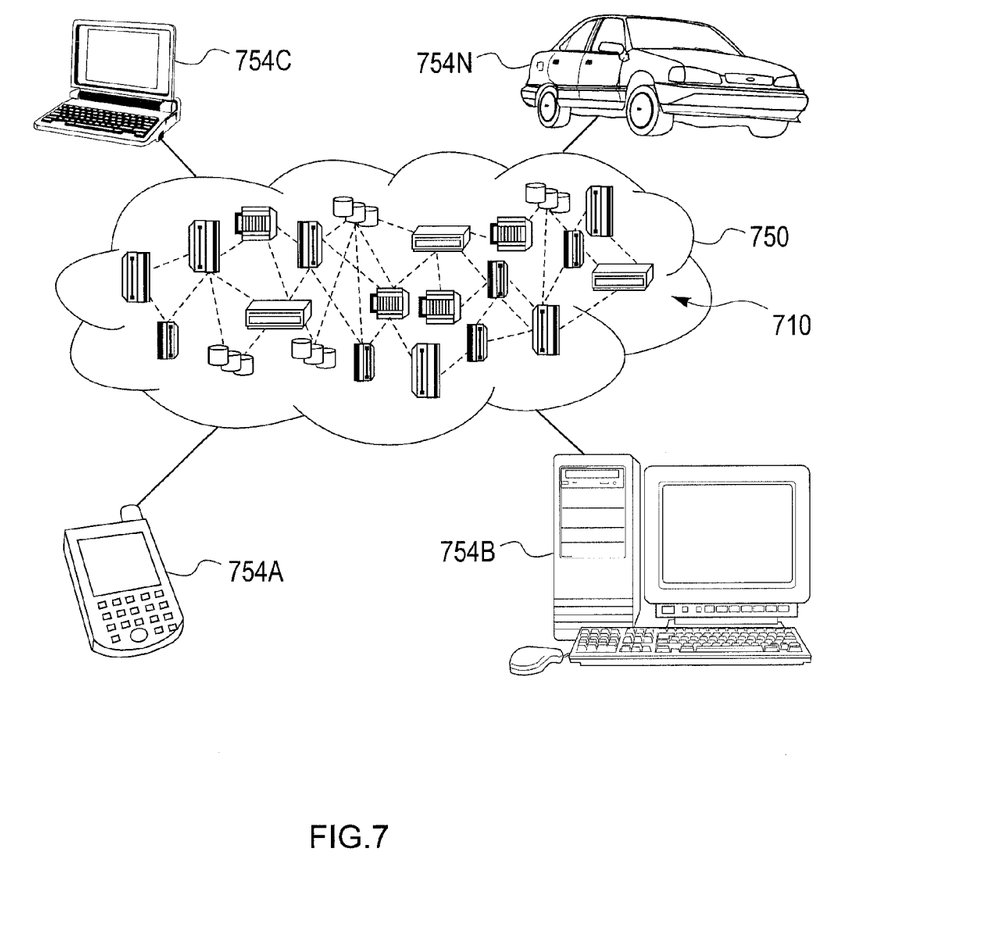
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
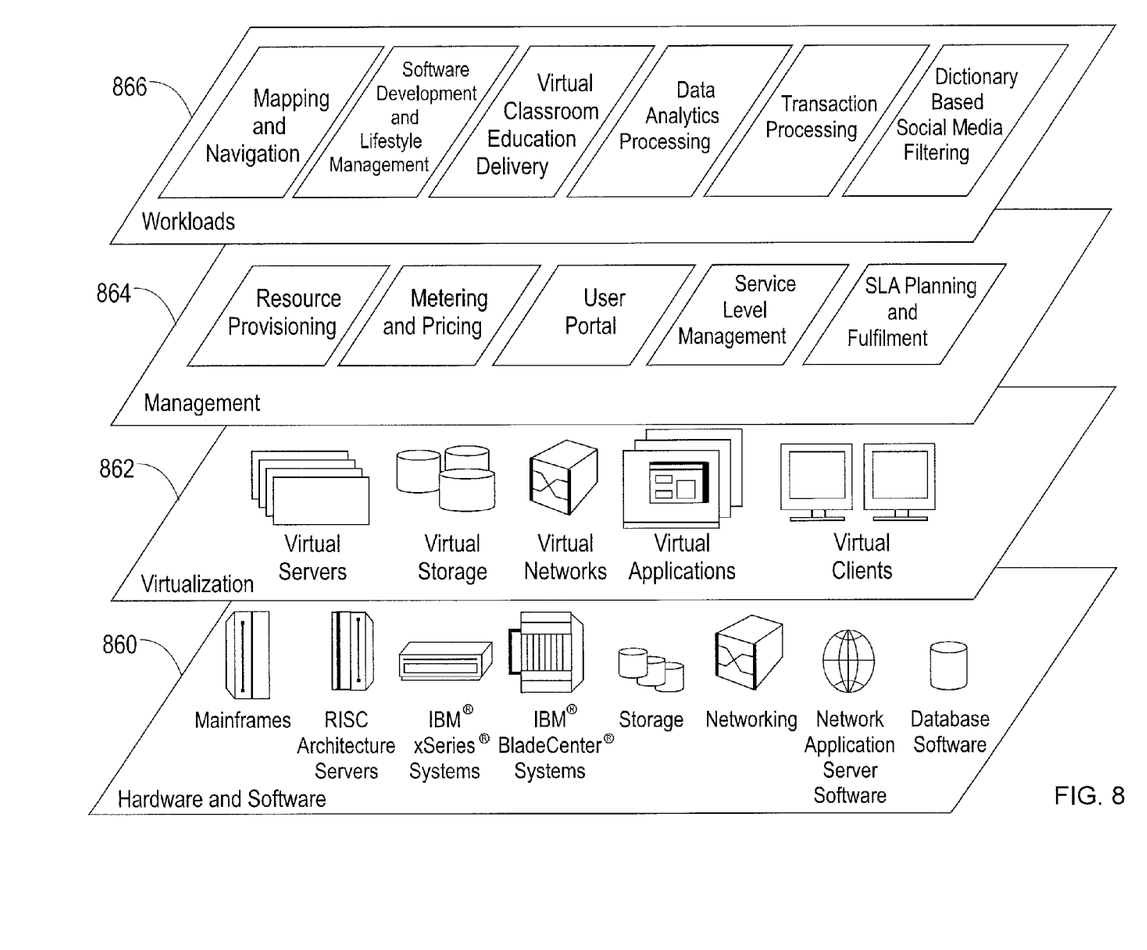
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and specifying linguistic dictionaries for filtering social media streams.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. In a computer processing system that reads and displays a social media stream accessible by a plurality of users, a method comprising:
   receiving, by a processor-based dictionary manager, at least one dictionary configuration, each specifying at least one dictionary from a set of dictionaries and respective settings for the at least one dictionary; and
   filtering, by a filter, the social media stream using the at least one dictionary configuration to provide at least one filtered social media stream,
   wherein the respective settings for the at least one dictionary comprise a respective dictionary influence polarity and a respective polarity magnitude for the respective dictionary influence polarity.

2. The method of claim 1, further comprising evaluating, by a configuration evaluator, the influence of the at least one dictionary configuration on the filtering, based on the at least one filtered social media stream.

3. The method of claim 2, further comprising analyzing, by a social media stream evaluator, the at least one filtered social media stream with respect to one or more criteria common to the at least one dictionary configuration.

4. The method of claim 2, wherein said evaluating step comprises evaluating an influence on the filtering of at least one of, the respective dictionary influence polarity and the respective polarity magnitude for the respective dictionary influence polarity, for the at least one dictionary specified by the at least one dictionary configuration.

5. The method of claim 1, further comprising adjusting an overall output volume of the filtering.

6. The method of claim 1, wherein the set of dictionaries comprises a subset of primary dictionaries and a subset of modifier dictionaries, wherein any one of the modifier dictionaries comprises at least one of a set of words that modify an influence of a respective one of the primary dictionaries in a first way and a set of words that modify the influence of the respective one of the primary dictionaries in a second way different from the first way.

7. The method of claim 1, wherein the at least one dictionary configuration comprises at least one primary dictionary and at least one modifier dictionary, the at least one modifier dictionary comprising at least one of,
   a respective set of words that modify an influence of a respective one of the at least one primary dictionary in a first way, and
   a respective set of words that modify the influence of the respective one of the at least one primary dictionary in a second way different from the first way.

8. The method of claim 1, further comprising adjusting the respective settings for at least one of the at least one dictionary specified by the dictionary configuration by:
   adjusting a value for the respective dictionary influence polarity; and
   adjusting a value for the respective polarity magnitude for the respective dictionary influence polarity.

9. The method of claim 1, further comprising:
   requesting a recommendation for additional dictionaries; and
   adding at least one of one or more recommended dictionaries to at least one of the set of dictionaries and the at least one dictionary configuration.

10. The method of claim 9, wherein said requesting step comprises issuing a request for the recommendation to a cognitive system.

11. The method of claim 9, wherein said requesting step comprises issuing a request for the recommendation to one or more other users.

12. The method of claim 1, further comprising receiving a specification of a set of users that share the at least one dictionary configuration.

13. The method of claim 12, further comprising:
   receiving a recommendation for additional users to share the at least one dictionary configuration; and
   adding at least one of one or more recommended users to the set of users that share the at least one dictionary configuration.

14. The method of claim 1, further comprising receiving a specification of at least one combination of dictionaries from the set to be respectively used as at least one of the at least one dictionary configuration.

15. The method of claim 14, further comprising adjusting settings of the at least one combination as a unit.

16. The method of claim 14, further comprising:
   specifying a respective name for each of the at least one dictionary configuration representing a respective one of the at least one combination; and
   initiating an action involving the at least one combination by referring to the respective name for the at least one dictionary configuration.

17. The method of claim 1, further comprising receiving a specification of at least one combination of dictionaries that include at least one respective dictionary from a respective one of multiple available sets of dictionaries.

18. The method of claim 17, wherein each of the sets of the multiple available sets represents a particular group of related dictionaries.

* * * * *